United States Patent
Tsitsiashvili

(10) Patent No.: US 7,146,184 B1
(45) Date of Patent: Dec. 5, 2006

(54) CELLULAR PHONE WITH INTEGRAL COSMETIC PACK

(76) Inventor: Aleko Tsitsiashvili, 102-35 64th Ave., apt. 4A, Forest Hills, NY (US) 11375

( * ) Notice: Subject to any disclaimer, the term of this patent is extended or adjusted under 35 U.S.C. 154(b) by 0 days.

(21) Appl. No.: 11/091,867

(22) Filed: Mar. 28, 2005

(51) Int. Cl.
*H04M 1/00* (2006.01)

(52) U.S. Cl. ............... 455/550.1; 455/556.1; 455/425; 455/575.1; 455/90.3; 455/433.12; 455/440; 455/428.01; 455/434; 455/446; 455/447; 455/556.2; 455/66.1; 455/344; 379/433.01

(58) Field of Classification Search ............. 455/550.1, 455/556.1, 425, 575.1, 575.4, 90.3, 556.2, 455/66.1, 344; 379/433.01, 433.12, 440, 379/428.01, 434, 446, 447
See application file for complete search history.

(56) References Cited

U.S. PATENT DOCUMENTS

| | | | |
|---|---|---|---|
| 1,800,230 A | | 4/1931 | Rosenthal |
| 3,441,033 A | | 4/1969 | Flax |
| 3,553,132 A | * | 1/1971 | Dunay et al. ................ 521/54 |
| 4,826,014 A | | 5/1989 | Schefer |
| 4,932,547 A | | 6/1990 | Rodriguez |
| 5,163,457 A | | 11/1992 | Lombardi, Jr. |
| 5,337,890 A | * | 8/1994 | Lai ............................ 206/235 |
| 5,638,839 A | | 6/1997 | Montoli |
| 6,311,077 B1 | * | 10/2001 | Bien ......................... 455/566 |
| 6,363,947 B1 | | 4/2002 | Wu |
| 6,422,245 B1 | | 7/2002 | Song |
| 6,788,919 B1 | * | 9/2004 | Watanabe .................. 455/90.3 |
| 2002/0137537 A1 | | 9/2002 | Watanabe |
| 2004/0192383 A1 | * | 9/2004 | Zacks et al. ................ 455/557 |
| 2005/0277453 A1 | * | 12/2005 | Kim ........................ 455/575.8 |

FOREIGN PATENT DOCUMENTS

| | | | |
|---|---|---|---|
| JP | 2000299719 A | * | 10/2000 |
| WO | WO2004/051968 | | 6/2004 |

* cited by examiner

*Primary Examiner*—Nick Corsaro
*Assistant Examiner*—Charles Shedrick
(74) *Attorney, Agent, or Firm*—Michael I. Kroll

(57) ABSTRACT

A personal communication and cosmetic storage device comprising a housing including personal communication circuitry having a first input portion and a second output portion pivotally connected to one another. At least one cosmetic storage layer is positioned within the first input layer for retaining and storing at least one type of cosmetic therein The device further includes a means for accessing the at least one cosmetic storage layer. The device is selectively operable in a first mode as a personal communication device and, in a second mode upon accessing the at least one cosmetic storage layer thereby allowing a user to access the stored cosmetic for application thereof.

14 Claims, 10 Drawing Sheets

CELLULAR PHONE WITH INTEGRAL COSMETIC PACK

BACKGROUND OF THE INVENTION

1. Field of the Invention

The present invention relates generally to a cellular phone and, more specifically, to a cellular phone having an integral cosmetic pack encompassed therein. The cellular phone is to be furnished with a plurality of compartments, which house a variety of cosmetic units. The cellular phone also has a vanity mirror conveniently attached to assist with the application of the cosmetics. The present invention reduces the amount of space commonly taken up in a womans purse by combing two objects typically found therein into a single convientent device.

2. Description of the Prior Art

There are other cosmetic based devices designed for carrying and applying cosmetics. Typical of these is U.S. Pat. No. 1,800,230 issued to Rosenthal on Nov. 18, 1929.

Another patent was issued to Flax on Apr. 29, 1969 as U.S. Pat. No. 3,441,033. Yet another U.S. Pat. No. 4,826,014 was issued to Schefer on May 2, 1989 and still yet another was issued on Jun. 12, 1990 to Roderiguez as U.S. Pat. No. 4,932,547.

Another patent was issued to Lombardi on Nov. 17, 1992 as U.S. Pat. No. 5,163,457. Yet another U.S. Pat. No. 5,337,890 was issued to Lai on Aug. 16, 1994. Another was issued to Montoli on Jun. 17, 1997 as U.S. Pat. No. 5,638,839 and still yet another was issued on Apr. 2, 2002 to Wu as U.S. Pat. No. 6,363,947.

Another patent was issued to Song on Jul. 23, 2002 as U.S. Pat. No. 6,442,245. Yet another U.S. Patent No. 2002/0137537 was issued to Wantanabe on Sep. 26, 2002. Another was issued to Napier-Clark et al on Jun. 17, 2004 as International Publication No. WO 2004/051968.

U.S. Pat. No. 1,800,230

Inventor: Bela Rosenthal

Issued: Nov. 18, 1929

Powder boxes are known in ladies' beauty culture, in which a certain quantity of loose powder is delivered through the holes in the lid of the powder container after the box lid has been opened, by turning the powder container by hand, in which the loose powder is whirled up by fixed blades or scoops arranged in the powder container and forced through the holes. The handling of such boxes is however inconvenient and requires a certain amount of skill.

U.S. Pat. No. 3,441,033

Inventor: Martha A. Flax

Issued: Apr. 29, 1969

A cosmetic kit composed of several shallow trays pivotally secured to one another for relative rotation into and out of mutually stacked positions about a single axis adjacent and parallel to the side of the trays. The top tray is selectively covered by a lid swiveledly mounted thereon. Each tray contains solid cosmetics and one or more applicators to aid in placing such cosmetics on a person's face. Each applicator has fixed to it one half of a "Velcro" fabric coupling. The other half of the "Velcro" fabric coupling is fixed to the bottom wall of the tray, thereby enabling the cosmetic applicator to be readily attached to or detached from the tray.

U.S. Pat. No. 4,826,014

Inventor: Eli I. Schefer

Issued: May 2, 1989

A compact case includes a top cover, a bottom support tray, and an intermediate lid positioned between the top cover and support tray, all being hinged together for relative movement with respect to one another, the support tray including a matrix configuration of ribs defining areas to accept the cosmetic inserts while the lid defines openings corresponding to the matrix configuration. The cosmetic inserts contain cosmetic materials and are removably positioned in selected ones of the areas. The openings in the lid register with the cosmetic inserts in the compact case.

U.S. Pat. No. 4,932,547

Inventor: Benet F. Roderiguez

Issued: Jun. 12, 1990

A casing having an elongated, cup-shaped body, with at least one compartment therein, a first cover slidably mounted on this body, and a second cover hingedly mounted upon this body. Facing edges of these two covers are provided with complementary pressure features, for snapping these two covers together when the covers are in their respective closed positions.

U.S. Pat. No. 5,163,457

Inventor: Carl M. Lombardi, Jr.

Issued: Nov. 17, 1992

A travel compact for housing a cosmetic supply and a mirror, wherein the cosmetic supply and the mirror are both encased therein in the storage mode of the compact. When the supply and the mirror are both exposed in a utility mode, the user may then view her face as she applies the cosmetic thereto. The compact includes a small rectangular case having an open front end and a top wall whose front section has an open window therein. Slidable in the case through its open end is a drawer whose top wall includes in its rear section a shallow well having a mirror nested therein, a front section on which is printed identifying indicia and a deeper well intermediate the front and rear sections in which a cosmetic supply is stored. In the storage mode, the drawer is pushed fully within the case, the window being closed by the front section of the drawer to expose the indicia through the window. In the utility mode, the drawer is pulled out to an extent exposing the cosmetic supply and aligning the mirror with the window. Detent means are provided to maintain the compact in either mode.

U.S. Pat. No. 5,337,890

Inventor: Chin-Chun Lai

Issued: Aug. 16, 1994

A cylindrical vanity case comprises mainly a case cover, a left case body, a right case body, and a mirror frame. The left case body, the right case body and the mirror frame are pivotally attached so that they can be turned to spread out. The cylindrical vanity case is provided with cellular compartments and slots for keeping therein a variety of cosmetics, such as eye shadow powder, rouge, lipstick, powder cake, eye colorstick, mascara, lip brush, brow brush, etc. The cylindrical vanity case is compact and can be carried easily and conveniently.

U.S. Pat. No. 5,638,839

Inventor: Antonio Montolli

Issued: Jun. 17, 1997

A refillable cosmetic case has a base with a recess for a releasable tray held in place by a tray retaining cover hinged in the base and having a latching element. The case lid has a rear edge and is hinged to the base at an edge opposite the tray cover hinge, and the lid rear edge can be associated with the tray to assist in its removal whereby when the lid is opened beyond its usual limit of travel the rear edge releases the latching element and thus the tray retaining cover. The cover pivots back on its hinge, so the tray can be lifted out and refilled or replaced.

U.S. Pat. No. 6,363,947

Inventor: Shang-Wu Wu

Issued: Apr. 2, 2002

A cosmetic case includes a case body, a cover, a slidable cover, and a drawer. The case body has two recesses in an upper surface, a drawer cavity in the bottom of the drawer to be pushed in and pulled out. The cover is pivotally connected to a front half portion of the case body to swing up and down and have a mirror fixed in an inner surface. The slidable cover is combined on a rear half portion of the case body, sliding in and out to open or close the shallow recess formed in the rear half portion. The drawer is positioned in the drawer cavity, with the ability to be pulled out or pushed in. Then many kinds of cosmetics can be stored in the recesses, the elongated hole, and the drawer.

U.S. Pat. No. 6,422,245

Inventor: Min Hoon Song

Issued: Jul. 23, 2002

Disclosed herein is a rouge compact. The rouge compact includes a body, which has a frame provided with a central opening and a low, inner step, a hook formed on an upper center portion of the frame, and a first hinge boss formed on a lower portion of the frame. A transparent or translucent rouge pallet contains rouge, and has a trough member partitioned by one or more partition walls and flange members extended from a circumferential edge of the trough member to be brought into contact with the step of the body. An intermediate plate is provided with a second hinge boss on its side. A lid covers the rouge pallet, and is formed to be arcuate to form a cosmetic appliance containing space, and a hook recess formed on an upper portion of the lid to engage with the hook, a third hinge boss formed on a lower portion of the lid, and a fourth hinge boss formed on one side of the lid. Two hinge pins are fitted into the first hinge boss of the body and the third hinge boss of the lid and into the second hinge boss of the intermediate plate and the fourth hinge boss of the lid, respectively.

U.S. Patent Number 2002/01375537

Inventor: Masahiro Wantanbe

Issued: Sep. 26, 2002

A cellular phone including a cosmetic container can be contained without becoming complicated or being bulky in the handbag, and it can take out from a handbag etc. easily and can be used when the phone receives a message. In addition, it can prevent forgetting a cellular phone and cosmetics.

International Publication Number WO 2004/051968

Inventor: Judith, Anne, Napier-Clark

Issued: Jun. 17, 2004

A portable personal communication and cosmetic apparatus comprising a base unit having side walls with cavities therein for receiving removable cosmetics products and a mobile phone unit mounted, e.g. removably, on the base unit.

While these cosmetic based devices may be suitable for the purposes for which they were designed, they would not be as suitable for the purposes of the present invention, as hereinafter described.

SUMMARY OF THE PRESENT INVENTION

The present invention relates generally to a cellular phone and, more specifically, to a cellular phone having an integral cosmetic pack encompassed therein. The cellular phone is to be furnished with a plurality of compartments, which house a variety of cosmetic units. The cellular phone also has a vanity mirror conveniently attached to assist with the application of the cosmetics. The present invention reduces the amount of space commonly taken up in a womans purse by combing two objects typically found therein into a single convientent device.

A primary object of the present invention is to provide a cellular phone with an integral cosmetic pack that overcomes the shortcomings of the prior art Another object of the present invention is to provide a cellular phone housing including a plurality of selectively accessible compartments for retaining cosmetics therein.

Still another object of the present invention is to provide a cellular phone with integral cosmetic packs whereby different layers of the cellular phone housing are made of a heat resistant material to maintain the integrity of the cosmetics.

Yet another object of the present invention is to provide a cellular phone with integral cosmetic packs that has a slideble partition therein, which houses cosmetics.

Another object of the present invention is to provide a cellular phone with integral cosmetic packs that is furnished with an antenna that dually acts as an applicator for said cosmetics.

Sill yet another object of the present invention is to provide a cellular phone with cosmetic packs that is furnished with an antenna that provides a hygienic housing for cosmetic applicators.

Yet another object of the present invention is to provide a cellular phone with integral cosmetic packs that are refillable and interchangeable.

Yet another object of the present invention is to provide a cellular phone with integral cosmetic pack that is simple and easy to use.

Still yet another object of the present invention is to provide a cellular phone with integral cosmetic pack that is inexpensive to manufacture and operate.

Additional objects of the present invention will appear as the description proceeds.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
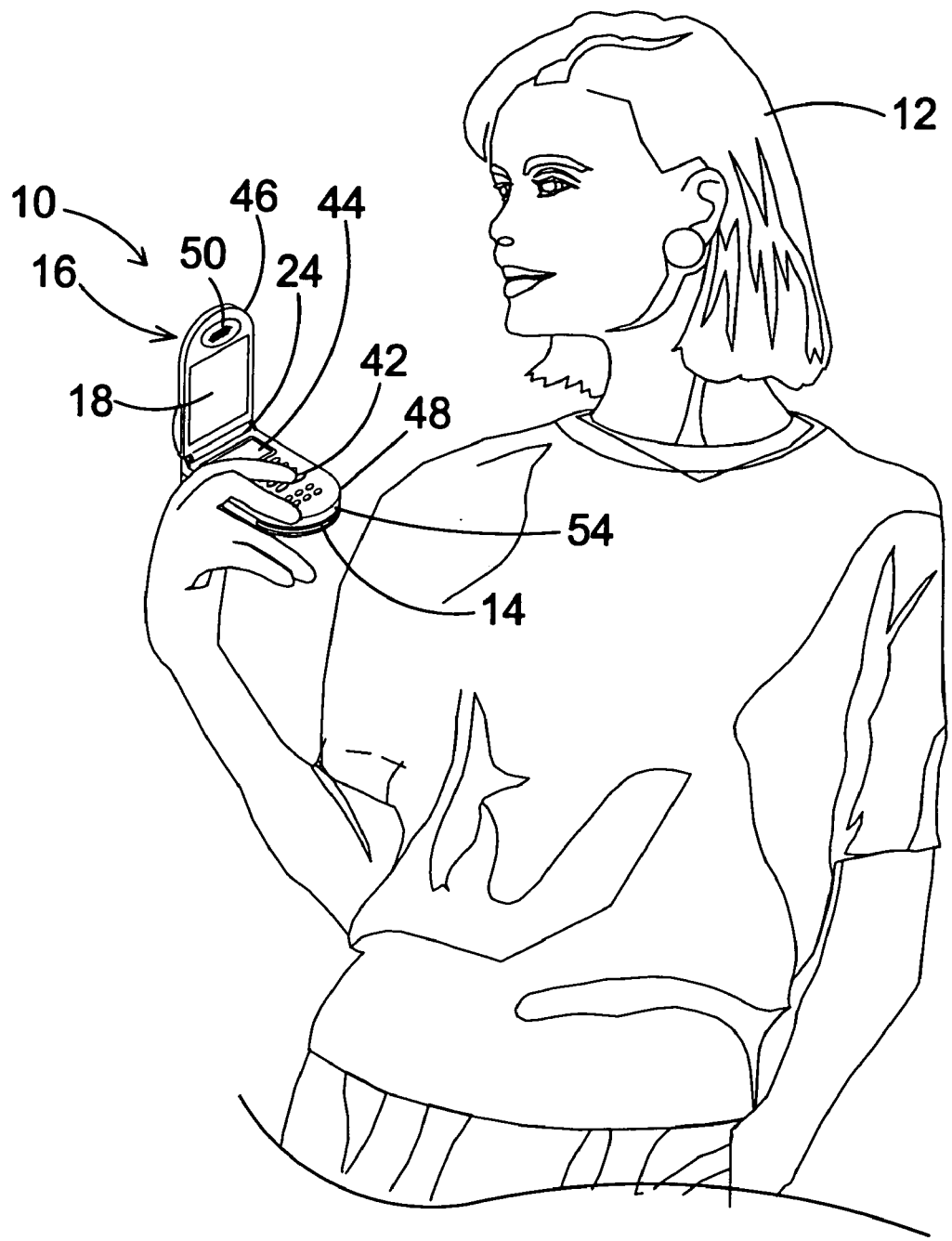
FIG. 1 is an illustrative view of the cellular cosmetics device of the present invention in use.

Turning now descriptively to the drawings, in which similar reference characters denote similar elements throughout the several views, the Figures illustrate the cellular cosmetics device of the present invention. With regard to the reference numerals used, the following numbering is used throughout the various drawing figures.

10 cellular cosmetics device of the present invention
12 user
14 cosmetics layers
15 pivotal cosmetics palette layers
16 housing
17 pivot
18 mirror
19 second mirror
20 slidable cosmetic layer
22 antenna
24 hinge
26 eye shadow
28 lip color
30 finger grip
32 blush
34 bronzer
36 cosmetic applicator
38 removable cap
42 alphanumeric keys
44 cell phone display
46 output portion
48 input portion
50 speaker
54 input portion layers
56 cosmetic wells
58 second cosmetic wells

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments. Practitioners skilled in the art will recognize numerous other embodiments as well. For definition of the complete scope of the invention, the reader is directed to appended claims.

Turning now descriptively to the drawings, in which similar reference characters denote similar elements throughout the several views, FIGS. 1 through 10 illustrate a cellular cosmetics device of the present invention which is indicated generally by the reference numeral 10.

FIG. 1 is an illustrative view of a cellular cosmetics device 10 of the present invention in use. Shown herein, a user 12 holds the cellular cosmetics device 10, hereinafter referred to as "the device 10," while using the cellular phone mode of the device 10. The housing of the device 10 is a flip-top cellular phone 16 with the capabilities and circuitry inherently associated with a conventional cellular phone. The housing 16 further includes a cosmetics layer 14. The cellular phone 16 has an output portion 46 for outputting audible sound. The output portion 46 includes a speaker 50 for outputting audible sound. A first illuminated mirror 18 is positioned on the output portion 46 of the housing 16 for aiding user when applying cosmetics contained in the cosmetics layer 14 as will be discussed hereinafter. The output portion 46 is pivotally connected by a hinge 24 to an input portion 48. The input portion 48 has a plurality of attached input portion layers 54, hereinafter referred to as layers 54, including but not limited to a pivotal cosmetics palette layer 15 and a slidable cosmetics palette layer 20, shown in FIG. 2. The cosmetics layers 14 are able to retain a plurality of different cosmetics for application by the user 12 and will be discussed hereinafter with reference to FIG. 3. The layers 54 are formed from a material so as to prevent the melting and deterioration of the cosmetics retained within the cosmetic layers. Alphanumeric keys 42 operate the cellular phone function as well as a display 44 for display of alphanumeric characters.

Figure 2:
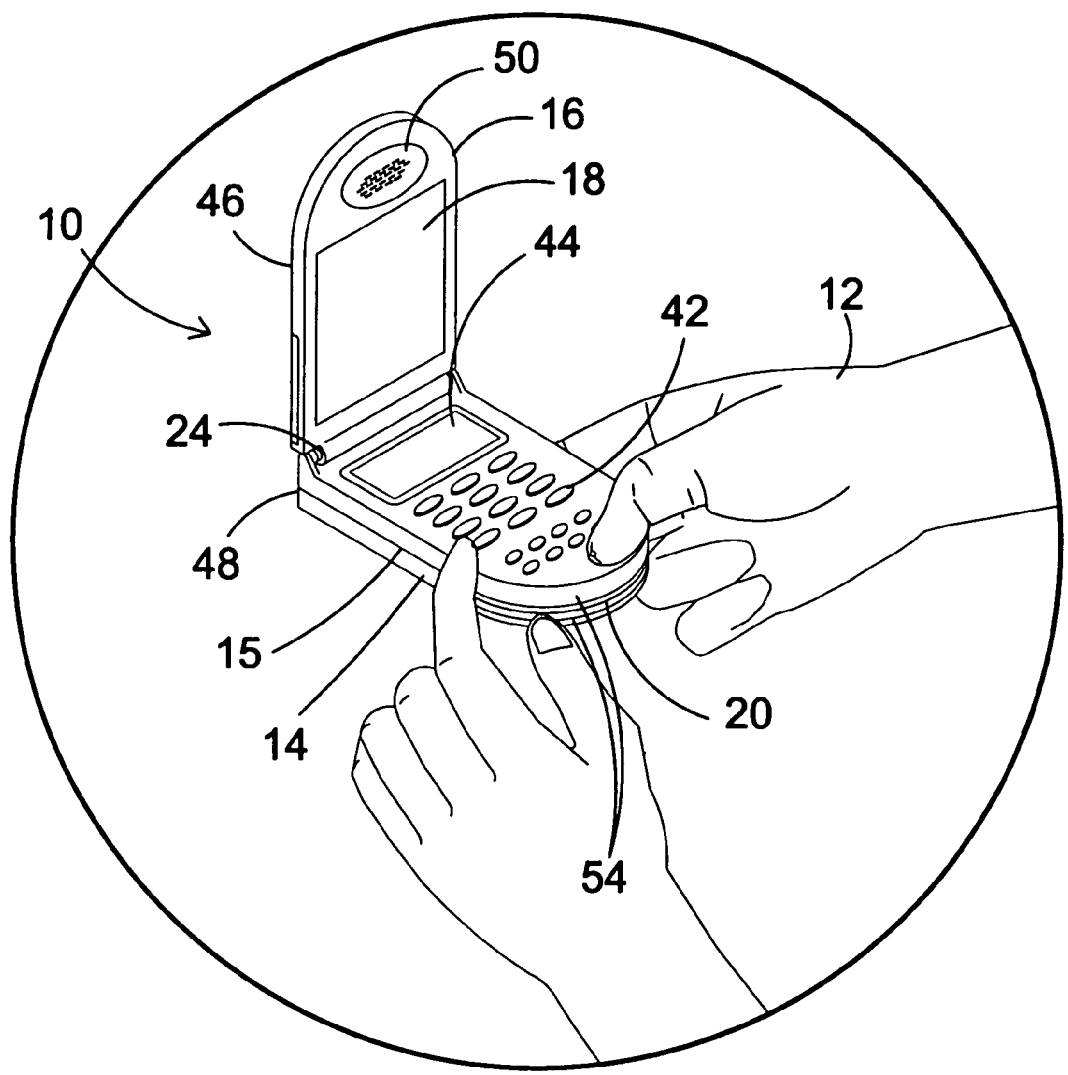
FIG. 2 is an illustrative view of the cellular cosmetics device of the present invention in use.

FIG. 2 is an illustrative view of a cellular cosmetics device 10 of the present invention in use. Shown herein, the user 12 holds the cellular cosmetics device 10 while using the cellular phone mode of the device 10. The housing 16 of the device 10 is a flip-top cellular phone 16 having cosmetics layers 14. The cellular phone 16 has an output portion 46 for outputting audible sound. The output portion 46 includes the speaker 50 for outputting audible sound and the first illuminated mirror 18. The output portion 46 is pivotally connected by the hinge 24 to the input portion 48. The input portion 48 has a plurality of layers 54, including but not limited to a palette layer 15 and a slidable cosmetics palette layer 20 that can slide in and out of the input portion 48 similar to a drawer. The palate layer 15 is pivotally connected to the input layer 48. The cosmetics layers 14 will be discussed hereinafter with reference to FIG. 3. The layers 54 are made of a material so as to prevent the melting and deterioration of the cosmetics. Alphanumeric keys 42 operate the cellular phone 16 function as well as a display 44 for display of alphanumeric characters.

Figure 3:
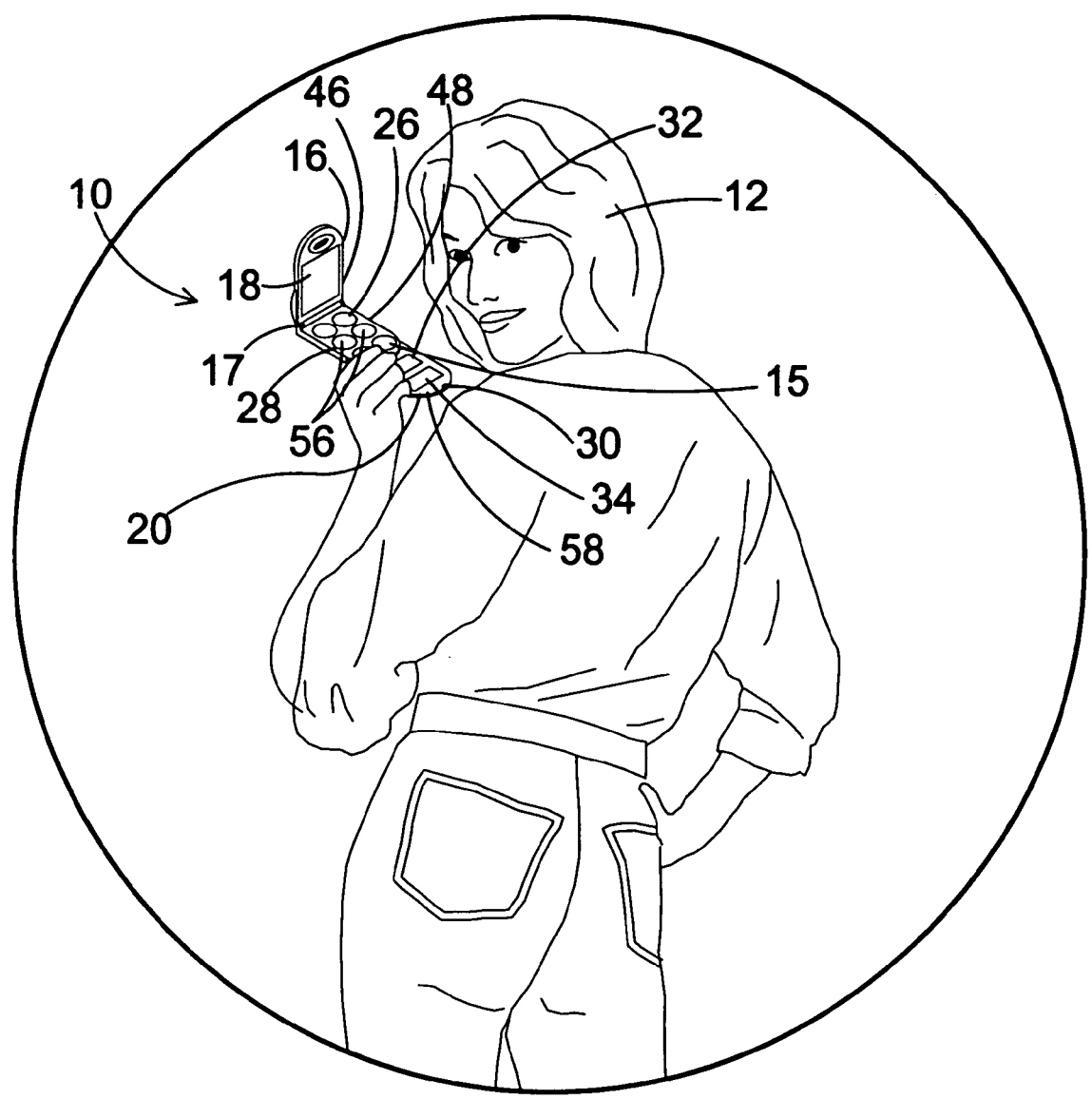
FIG. 3 is an illustrative view of the cellular cosmetics device of the present invention in use.

FIG. 3 is an illustrative view of a cellular cosmetics device 10 of the present invention in use. Shown herein, the user 12 is holding the cellular cosmetics device 10 of the present invention while using the device 10 as a cosmetic pack. The housing 16 of the device 10 is formed as a flip-top cellular phone. The output portion 46 is pivotally connected by a hinge 24 to an input portion 48. The input portion 48 has a plurality of attached input portion layers 54 The layers include at least one of a cosmetics palette layer 15 and a slidable cosmetics palette layer 20, that can slide into and out of the input portion 48 similar to a drawer. The cosmetics palette layer 15 is pivotally connected to the input layer 48 via a pivot 17. The layers 54 are made of a material so as to prevent the melting and deterioration of the cosmetics.

As shown herein, the input portion 48 is pivoted about pivot 17 and is positioned adjacent to the output portion 46 of the housing 16. In this position, the cosmetic palette layer 15 is exposed. The slidable cosmetic layer 20 is shown in a first open position whereby the slidable cosmetic layer 20 is slid out from the cosmetic layer 14 of the input layer 48. The cosmetics layers 14 include at least one slidable cosmetics layer 20, whereby the layer slides in and out of the housing like a drawer. A finger grip 30 is located on the exposed edge of the slidable cosmetics layer 20, for ease of sliding the layer in and out.

The cosmetic palette layer 20 includes a plurality of round cosmetics wells 56 and the slidable cosmetic layer 20 includes a plurality of rectangular cosmetic wells 58. The cosmetics housed in the cosmetic wells 56, 58 include but are not limited to eye shadows 26, lip colors 28, blush 32 and bronzer 34. Herein, the round cosmetic wells 56 house the eye shadow 26 and the lip colors 28 and the rectangular cosmetic wells 58 house the blush 32 and bronzer 34. The cosmetics housed in the cosmetic wells 56 are removable and can be exchanged for cosmetics in different shades as well as different types of cosmetics. Alternatively, the entire pivotal cosmetics palette layer 15 can be removed and exchanged for a different pivotal cosmetics palette layer 15.

Figure 4:
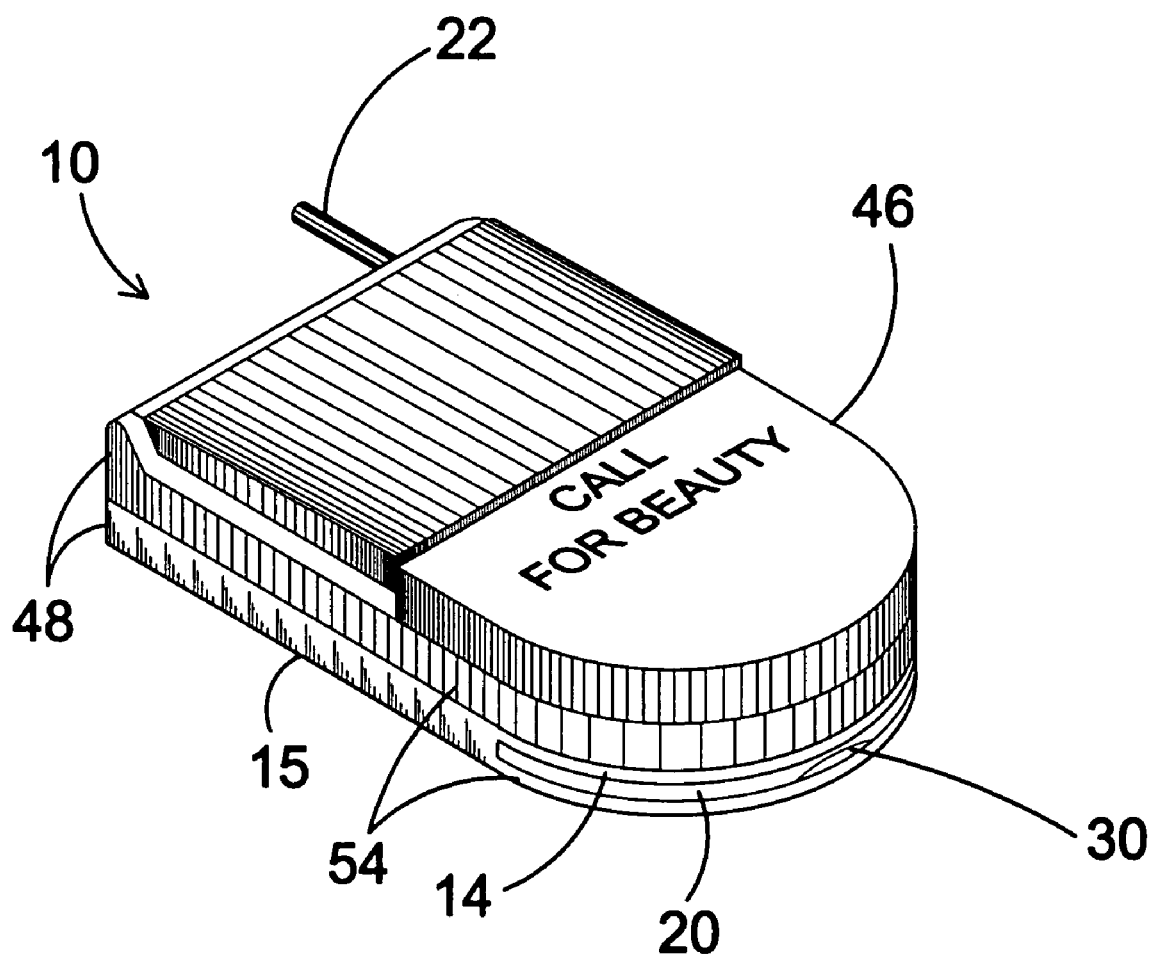
FIG. 4 is a perspective view of the cellular cosmetics device of the present invention in a closed position.

FIG. 4 is a perspective view of the cellular cosmetics device 10 of the present invention in the closed position. The housing 16 of the device 10 is a flip-top cellular phone 16 and also includes the cosmetics layers 14. The housing 16 has an output portion 46 for outputting audible sound. The output portion 46 is pivotally connected by a hinge 24 to an input portion 48. The input portion 48 has a plurality of attached input portion layers 54 The layers 54 include at least one of the cosmetics palette layer 15 and the slidable cosmetics palette layer 20, that can slide into and out of the input portion 48 as would a drawer. The cellular keypad layer 52 is positioned between the output portion 46 and the cosmetic palette 15. device 10. The keypad layer 52 is pivotally connected to the cosmetics palette layer 15. The layers 54 are made of a material so as to prevent the melting and deterioration of the cosmetics retained therein. Extending outward from the cellular phone housing 16 where the output portion 46 and the input portion 48 are hinged 24 is an antenna 22 for use with the cellular phone mode. The antenna 22 also acts as a housing for a cosmetic applicator 36 that will be discussed hereinafter with reference to FIG. 9. A finger grip 30 is located on the exposed edge of the slidable cosmetics compartment 20, for ease of sliding the layer in and out.

Figure 5:
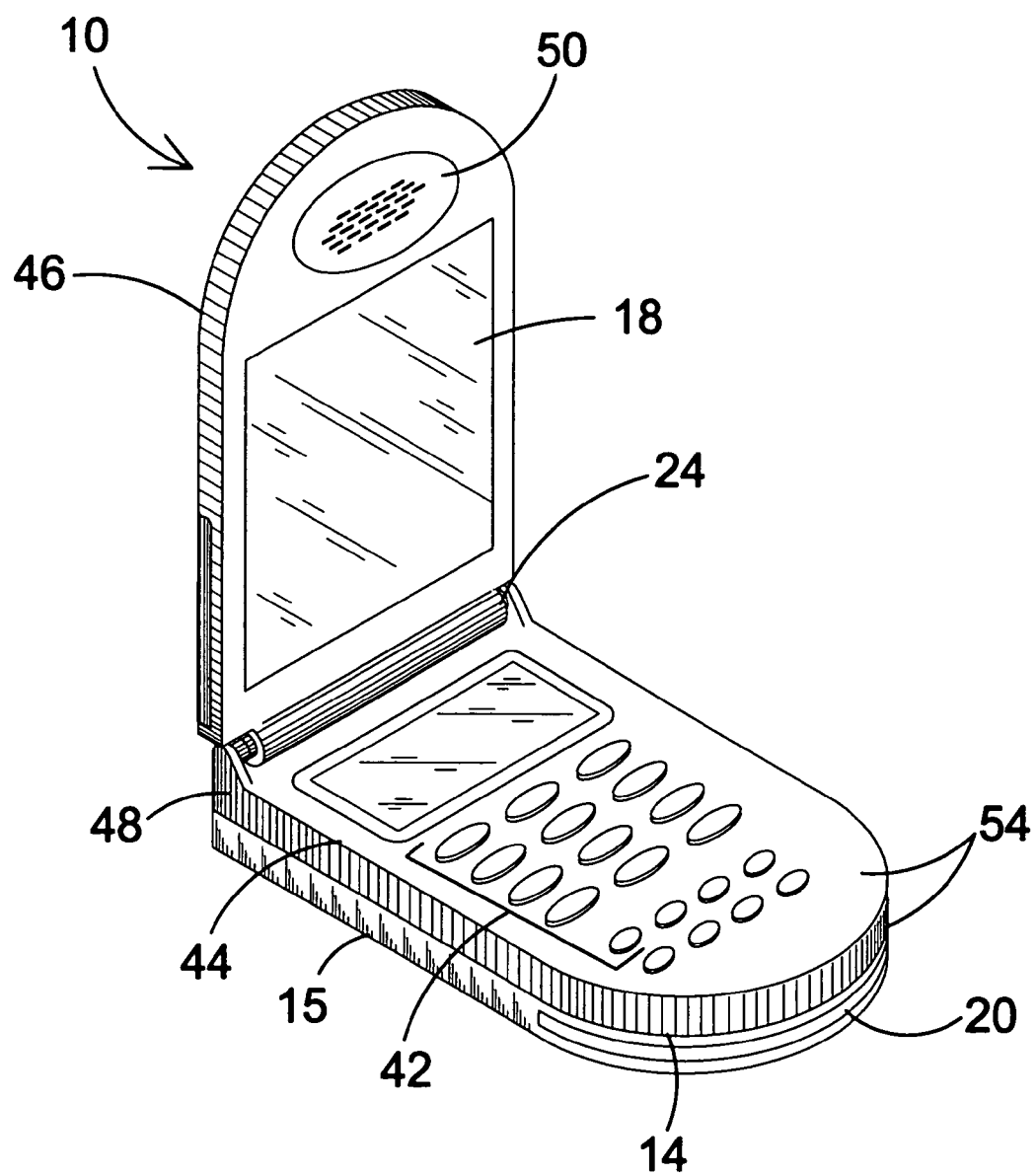
FIG. 5 is a perspective view of the cellular cosmetics device of the present invention in a first open position.

FIG. 5 is a perspective view of the cellular cosmetics device 10 of the present invention in the cellular phone mode open position. The housing 16 of the device 10 is a flip-top cellular phone having cosmetics layers 14. The housing 16 has the output portion 46 for outputting audible sound via speaker 50. Also, the output portion 46 includes an illuminated mirror 18. The output portion 46 is pivotally connected by the hinge 24 to the input portion 48. The input portion 48 has a plurality of attached input portion layers 54 including a cosmetics palette layer 15 and a slidable cosmetics layer 20. The layers 54 are made of a material so as to prevent the melting and deterioration of the cosmetics. Alphanumeric keys 42 operate the cellular phone 16. The cellular keypad layer further includes the display 44 for display of alphanumeric characters thereon such as when a phone number is dialed or when a phone cell is received when in the cellular mode. When in cellular mode, the device 10 of the present invention operates according to the principles associated with known cellular phone technology and the housing 16 includes all necessary circuitry required so as to render the device 10 as a fully functional cellular phone.

Figure 6:
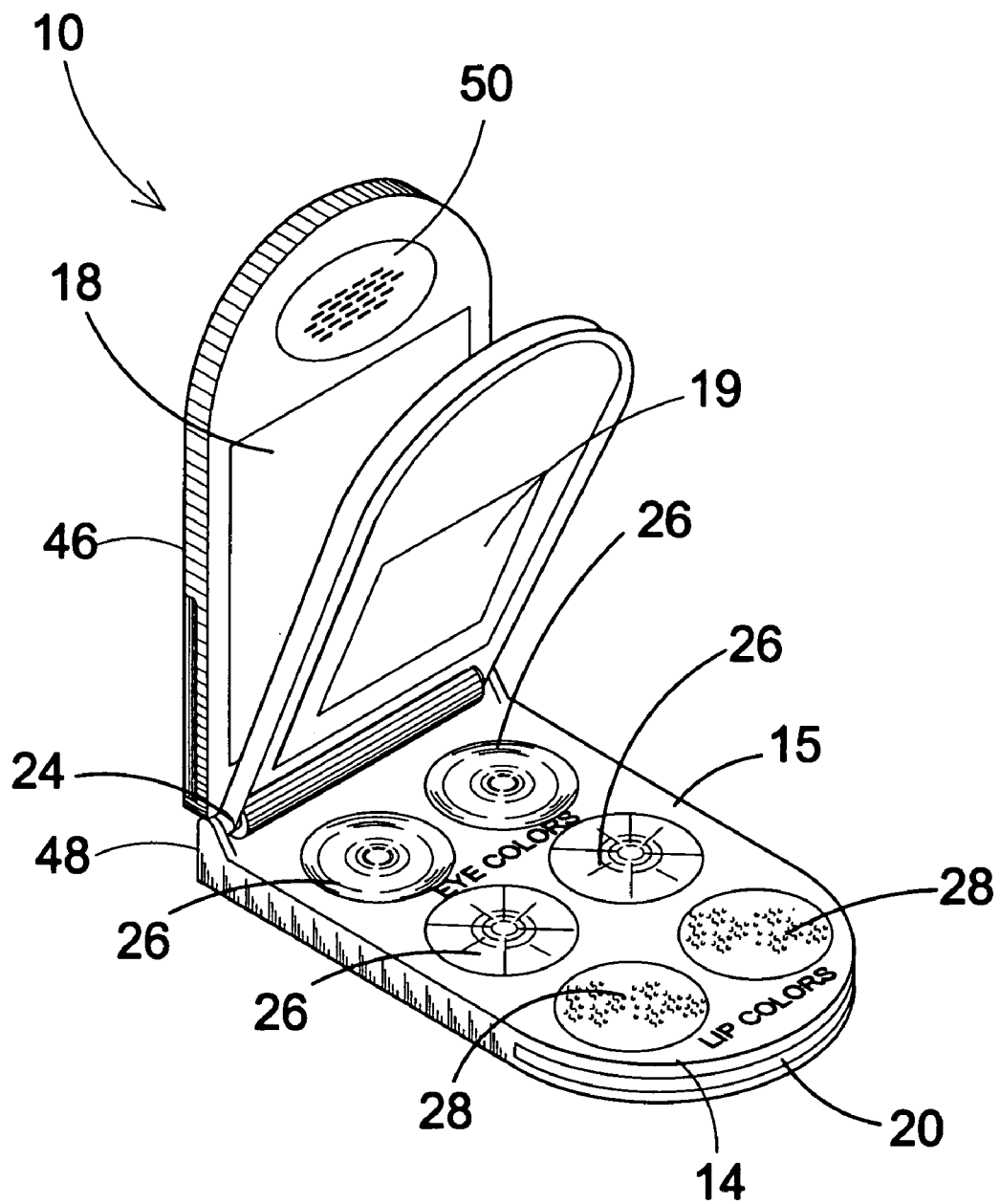
FIG. 6 is a perspective view of the cellular cosmetics device of the present invention in a second open position.

FIG. 6 is a perspective view of the cellular cosmetics device 10 of the present invention in the cosmetics mode. The housing 16 of the device 10 is a flip-top cellular phone having cosmetics layers 14. The housing 16 has the output portion 46 for outputting audible sound via speaker 50. Also, the output portion 46 includes an illuminated mirror 18. The output portion 46 is pivotally connected by the hinge 24 to the input portion 48. The input portion 48 has a plurality of attached input portion layers 54 including a cosmetics palette layer 15 and a slidable cosmetics layer 20. The layers 54 are made of a material so as to prevent the melting and deterioration of the cosmetics.

As shown herein, the input portion 48 is pivoted about the hinge 24 and moved in contact with the output portion 46 of the housing 16 and thereby revealing an underside. On the underside is a second illuminated mirror 19, for use with application of the cosmetics. Upon moving the output portion 46 of the housing, the cosmetics layer 14 is revealed.

The cosmetic layer 14 includes the cosmetic palette layer 15 having a plurality of cosmetics wells 56 for retaining cosmetics therein. The cosmetics housed in the cosmetic wells 56 include but are not limited to eye shadows 26 and lip colors 28. The cosmetics housed in the cosmetic wells 56 are removable and can be exchanged for cosmetics in different shades as well as different types of cosmetics. Alternatively, the entire pivotal cosmetics palette layer 15 can be removed and exchanged for a different pivotal cosmetics palette layer 15. The cosmetics layers 14 include at least one slidable cosmetics layer 20, whereby the layer slides in and out of the housing like a drawer and will be discussed hereinafter with specific reference to FIG. 7.

Figure 7:
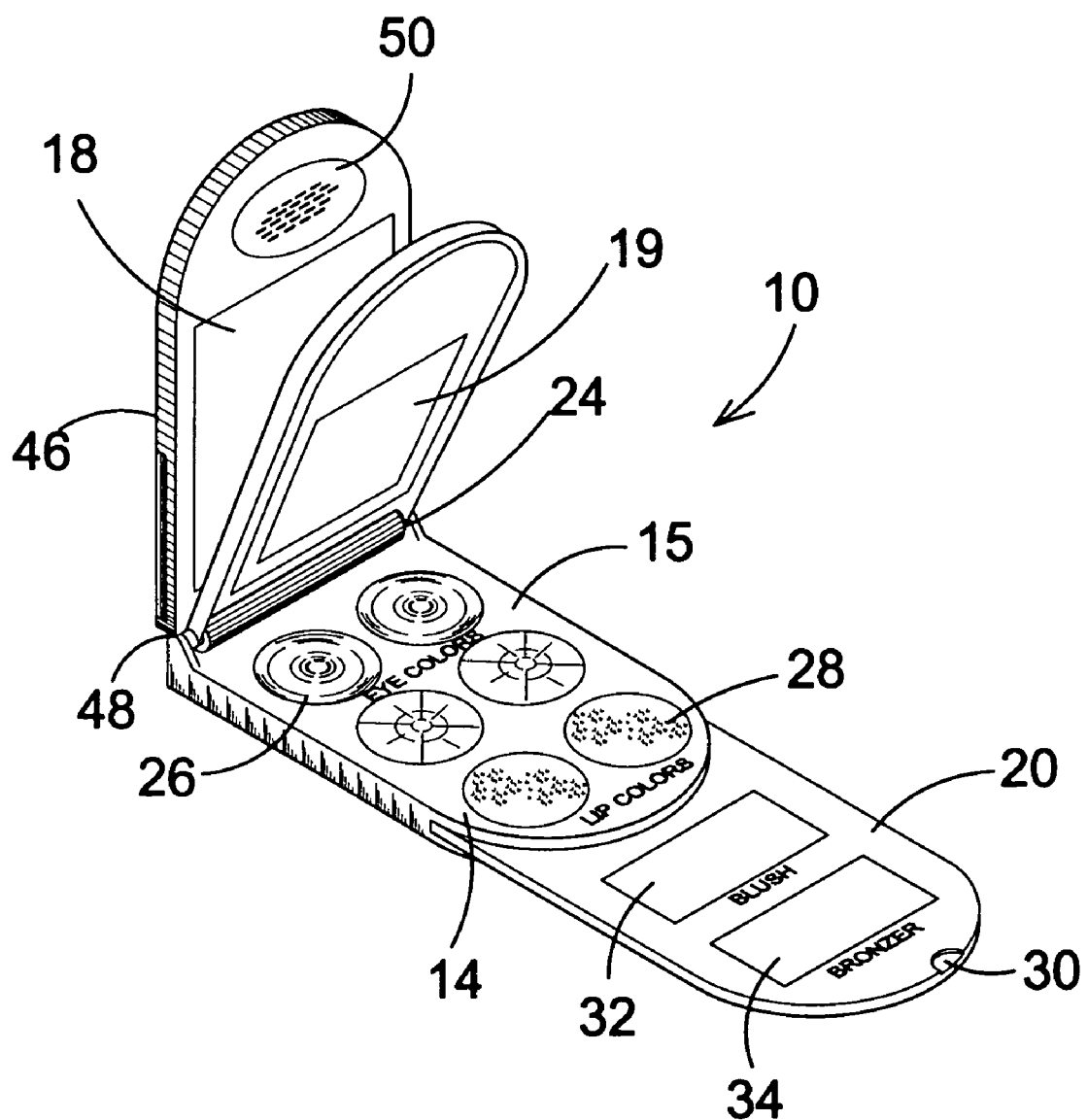
FIG. 7 is a perspective view of the cellular cosmetics device of the present invention in a third open position.

FIG. 7 is a perspective view of the cellular cosmetics device 10 of the present invention in the cosmetics mode. The housing 16 of the device 10 is a flip-top cellular phone having cosmetics layers 14. The housing 16 has the output portion 46 for outputting audible sound via speaker 50. Also, the output portion 46 includes an illuminated mirror 18. The output portion 46 is pivotally connected by the hinge 24 to the input portion 48. The input portion 48 has a plurality of attached input portion layers 54 including a cosmetics palette layer 15 and a slidable cosmetics layer 20. The layers 54 are made of a material so as to prevent the melting and deterioration of the cosmetics.

As shown herein, the input portion 48 is pivoted about the hinge 24 and moved in contact with the output portion 46 of the housing 16 and thereby revealing an underside 53. On the underside is a second illuminated mirror 19, for use with application of the cosmetics. Upon moving the output portion 46 of the housing, the cosmetics layer 14 is revealed. The cosmetic layer 14 includes the cosmetic palette layer 15 having a plurality of cosmetics wells 56 for retaining cosmetics therein. The cosmetics housed in the cosmetic wells 56 include but are not limited to eye shadows 26 and lip colors 28. The cosmetics housed in the cosmetic wells 56 are removable and can be exchanged for cosmetics in different shades as well as different types of cosmetics. Alternatively, the entire pivotal cosmetics palette layer 15 can be removed and exchanged for a different pivotal cosmetics palette layer 15.

The cosmetics layers 14 include at least one slidable cosmetics layer 20, whereby the layer slides in and out of the housing like a drawer. The finger grip 30 is located on the exposed edge of the slidable cosmetics compartment 20, for ease of sliding the layer in and out. Upon sliding the compartment 20 out from the input layer 48, additional cosmetic wells 58 are revealed. The cosmetic wells 58 are preferably rectangular in shape and are able to retain at least one of blush and bronzer therein. However, these wells 58 can include any desired type of cosmetic therein. Similar to the wells 56, the rectangular wells 58 are selectively replaceable as well. Also, the compartment 20 may be selectively removed from the housing 16 and replaced with an new and/or different compartment 20.

Figure 8:
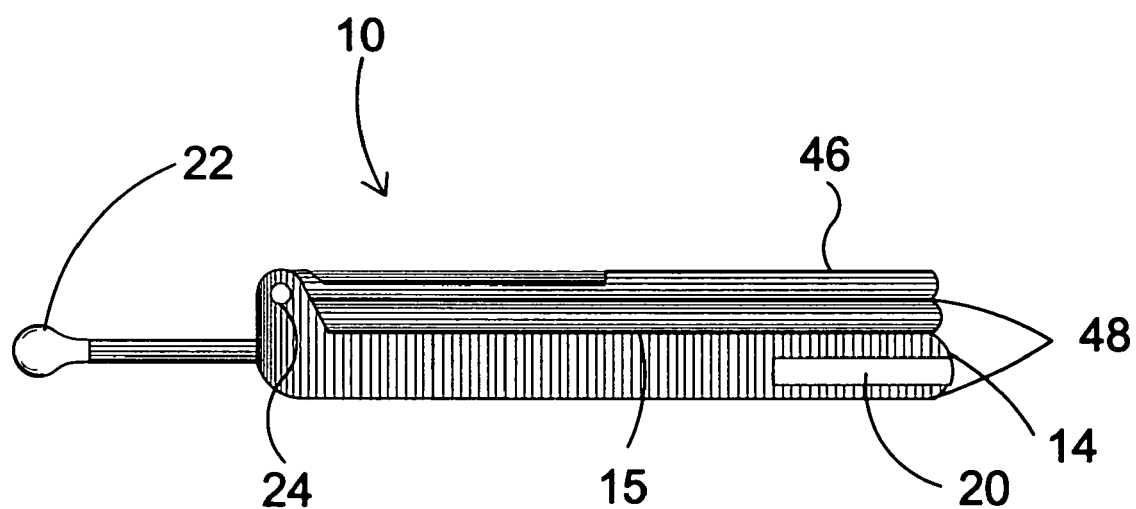
FIG. 8 is a side view of the cellular cosmetics device of the present invention in a closed position.

FIG. 8 is a side view of the cellular cosmetics device 10 of the present invention in the closed position. The housing 16 of the device 10 is a flip-top cellular phone having cosmetics layers 14. The cellular phone 16 has the output portion 46 for outputting audible sound. The output portion 46 is pivotally connected by the hinge 24 to the input portion 48. The input portion 48 has a plurality of attached input portion layers 54 including but not limited to the cosmetics palette layer 15 and a slidable cosmetics compartment 20. The layers 54 are made of a material so as to prevent the melting and deterioration of the cosmetics retained therein.

Extending outward from the cellular phone housing 16 where the output portion 46 and the input portion 48 are hinged 24 is an antenna 22 for use with the cellular phone mode. The antenna 22 also acts as a housing for the cosmetic applicator 36, that will be discussed hereinafter with reference to FIG. 9.

Figure 9:
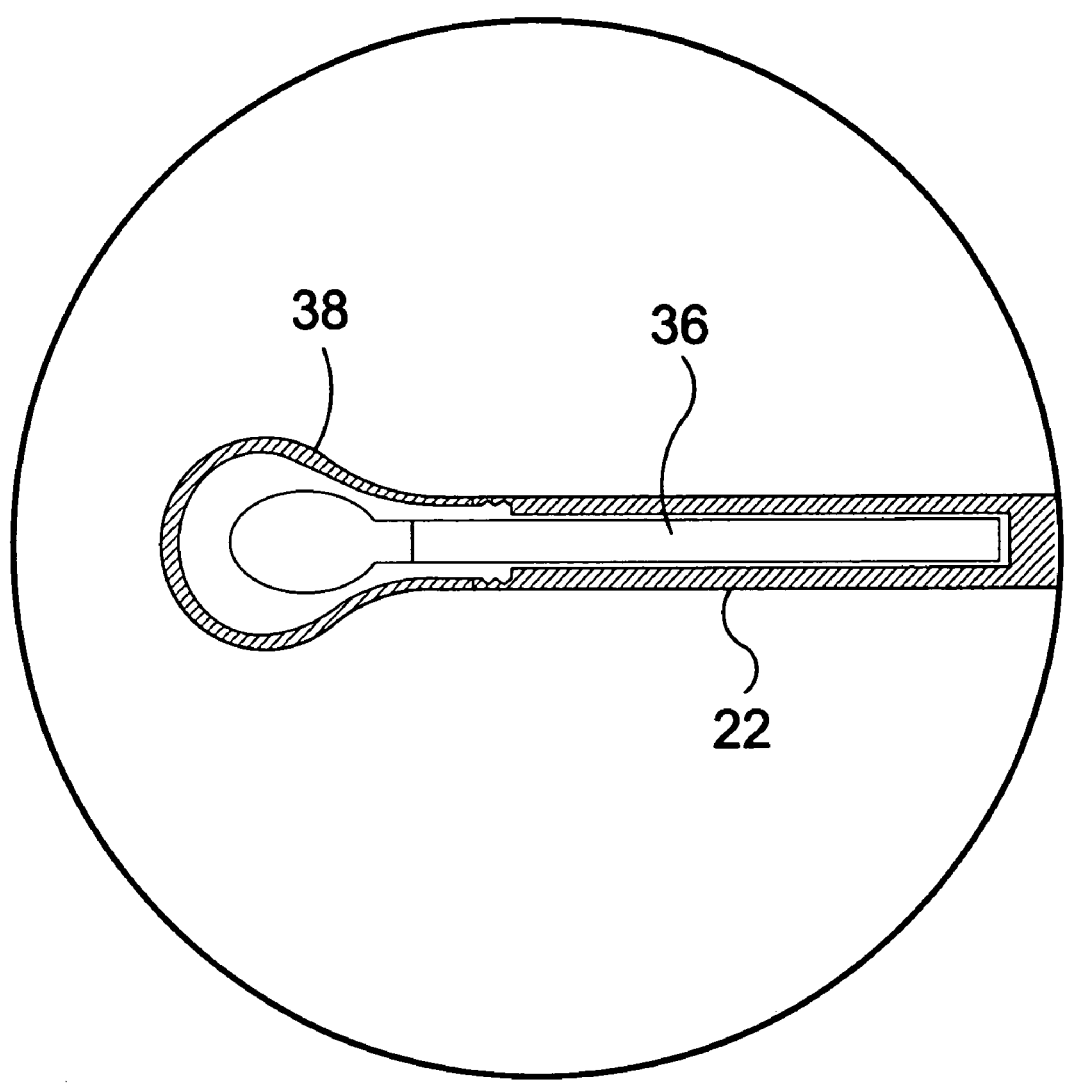
FIG. 9 is a sectional view of the cellular cosmetics device of the antenna lip brush applicator of the present invention.

FIG. 9 is a sectional view of the antenna 22 of the cellular cosmetics device 10 of the present invention. The antenna 22 is for use with the device 10 in the cellular phone mode. The antenna 22 also acts as a housing for a cosmetic applicator 36. Alternatively a plurality of cosmetic applicators 36 could be housed in the antenna 22. The shaft of the antenna 22 is attached at one end to the cellular phone housing 16. A removable cap 38 is removably attached at a second end of the shaft of antenna 22 opposite the housing 16. Upon removing the cap 38 from the antenna 22, the cosmetic applicator 36 can be selectively removed for use in application of any of the cosmetics retained in the cosmetics layer 14. The removable cap 38 is shaped so as to avoid contact with the applicator portion of the cosmetic applicator 36. The removable cap 38 is attached to the shaft of the antenna 22 so that upon removal thereof, the hands of the user will not contact the applicator tip. Furthermore, the user, upon removing the applicator brush 36 from the antenna housing 22, will not contact the user's hand. This prevents transferring hand bacteria to the cosmetic applicator 36 and ensures sanitary use thereof.

Figure 10:
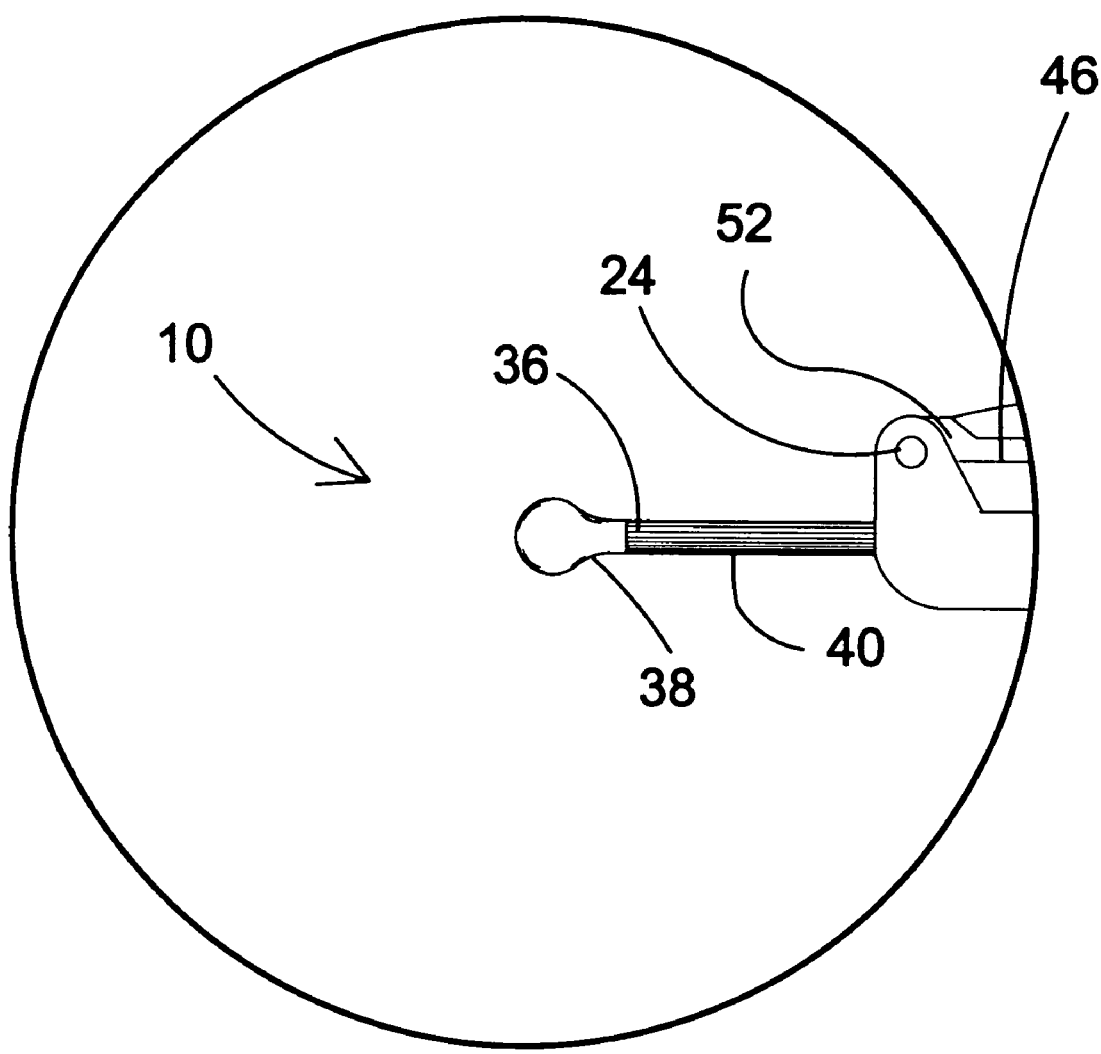
FIG. 10 is an enlarged view of the cellular cosmetics device of the antenna lip brush applicator of the present invention.

FIG. 10 is an enlarged view of the antenna 22 of the cellular cosmetics device 10 of the present invention. Extending outward from the cellular phone housing 16 where the output portion 46 and the input portion 48 are hinged 24 is an antenna 22 for use with the cellular phone mode. The antenna 22 also acts as a housing, shown in FIG. 9, for the cosmetic applicator 36. The shaft of the antenna 22 is attached at one end to the cellular phone housing 16. The second end of the shaft of antenna 22 is attached to a removable cap 38 to allow for selectively storing and removing the cosmetic applicator 36. The removable cap 38 is shaped so as to avoid contact with the applicator portion of the cosmetic applicator 36. The removable cap 38 is attached to the shaft of the antenna 22 in a way that when removed, the cosmetic applicator 36 can be removed without soiling the hands and without transferring hand bacteria to the cosmetic applicator 36.

It will be understood that the flip top cellular phone housing 16 is the embodiment described in FIGS. 1–10. However, the cellular cosmetics device of the present invention is not limited to the flip top cellular phone housing 16 and alternate embodiments, such as any cellular phone or any portable communication device, including but not limited to the wireless email solution with integrated phone that is sold under the tradename Blackberry™, can be used.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. Personal communication and cosmetic storage device comprising:
   a) a housing including personal communication circuitry having a first input portion and a second output portion pivotally connected to one another, said second output portion having an illuminated mirror mounted for viewing when said second output portion is pivoted into an open position, said first input portion having a keypad, function keys and a screen for displaying communication information;
   b) a cosmetic portion pivoted at an underside of said first input portion containing cosmetics which are available when said cosmetic portion is pivoted into an open position, an underside of said first input portion having an illuminated mirror for viewing when said cosmetic portion is pivoted into said open position;
   c) said cosmetic portion having a compartment for a slidable member containing additional cosmetics which are exposed for use when said slidable member is extended out of said compartment;
   d) said first input portion, second output portion and cosmetic portion all sharing one hinge; and
   e) an antenna extending out from said housing containing a cosmetic applicator.

2. The device as recited in claim 1, wherein said cosmetic portion includes a plurality of cosmetic wells for retaining a plurality of cosmetics therein.

3. The device as recited in claim 2, wherein each of said retained cosmetics is selectively replaceable with a new cosmetic.

4. The device as recited in claim 3, wherein said cosmetic wells contain at least one of eye shadow, lip gloss, lip colors, powder, blush and bronzer.

5. The device as recited in claim 4, wherein said second output portion includes a speaker for audible outputting a received sound signal.

6. The system as recited in claim 5, wherein said first input portion includes a communication input device and an input microphone for detecting an audible sound for transmission thereof by said personal communication device.

7. The device as recited in claim 6, wherein said antenna is a housing for retaining said cosmetics applicator.

8. The device as recited in claim 7, wherein said antenna comprises a hollow cylindrical shaft connected to said housing at a first end thereof and a removable cap removably connected at a second end of said hollow cylindrical shaft opposite said first end.

9. The device as recited in claim 8, wherein said removable cap has a bulbous shape so at to avoid contact with an applicator portion of said applicator and of sufficient length that hands of a user will not contact said applicator portion when removing said applicator.

10. The device as recited in claim 9, wherein upon removing said removable cap, said cosmetics applicator is selectively removeable from within said hollow shaft for use in applying said cosmetics stored in said cosmetic portion.

11. The device as recited in claim 10, wherein said cosmetic applicator is a brush.

12. The device as recited in claim 11, wherein said housing is formed as a flip-to-open cellular phone.

13. The device as recited in claim 12, wherein said housing is formed from a heat resistant material thereby preventing any heat transference between said portions.

14. The device as recited in claim 13, wherein said cosmetic portion is selectively disconnectable from said first input portion for replacement thereof.

* * * * *